United States Patent
Czyz et al.

(10) Patent No.: US 7,845,959 B2
(45) Date of Patent: Dec. 7, 2010

(54) COMPONENT POSITION ASSURANCE ELEMENT FOR A POWER DISTRIBUTION BLOCK

(75) Inventors: Anthony Steven Czyz, Schaumburg, IL (US); Norman Darrick Santa Maria, Chicago, IL (US)

(73) Assignee: Cooper Technologies Company, Houston, TX (US)

( * ) Notice: Subject to any disclaimer, the term of this patent is extended or adjusted under 35 U.S.C. 154(b) by 54 days.

(21) Appl. No.: 12/349,281

(22) Filed: Jan. 6, 2009

(65) Prior Publication Data

US 2010/0173532 A1 Jul. 8, 2010

(51) Int. Cl.
*H01R 12/00* (2006.01)
(52) U.S. Cl. ..................................... 439/76.2
(58) Field of Classification Search ............. 439/76.2, 439/76.1, 718, 367, 370; 174/138 F
See application file for complete search history.

(56) References Cited

U.S. PATENT DOCUMENTS

| | | | | |
|---|---|---|---|---|
| 3,683,314 | A | * | 8/1972 | Elkins .................... 439/367 |
| 4,026,620 | A | * | 5/1977 | Lieberman .............. 439/189 |
| 4,124,878 | A | * | 11/1978 | Ebner et al. .............. 361/802 |
| 5,023,752 | A | * | 6/1991 | Detter et al. ............. 361/752 |
| 5,695,259 | A | | 12/1997 | Isshiki et al. |
| 5,785,532 | A | | 7/1998 | Maue et al. |
| 6,015,302 | A | | 1/2000 | Butts et al. |
| 6,371,799 | B1 | | 4/2002 | Alfaro et al. |
| 6,657,852 | B2 | * | 12/2003 | Reker ..................... 361/622 |
| 6,848,946 | B2 | * | 2/2005 | Vicenza et al. ........ 439/620.29 |
| 7,396,262 | B2 | | 7/2008 | Korczynski et al. |
| 7,612,647 | B2 | * | 11/2009 | Onoda et al. ............ 337/229 |

FOREIGN PATENT DOCUMENTS

EP 1677583 A1 12/2005
EP 1995121 A1 5/2007

OTHER PUBLICATIONS

International Searching Authority, PCT/US2009/067965, International Search Report and Written Opinion of the International Searching Authority, Mar. 24, 2010, 15 pages.

* cited by examiner

*Primary Examiner*—Phuong K Dinh
(74) *Attorney, Agent, or Firm*—Armstrong Teasdale LLP (57) ABSTRACT

A power distribution block includes a housing, a plurality of terminals situated in the housing, a plurality of electrical components, each of the electrical components mechanically and electrically engaged to respective terminals, wherein a portion of at least one electrical component protrudes from the housing, and a component position assurance element substantially enclosing the protruding portions of the electrical components.

26 Claims, 13 Drawing Sheets

COMPONENT POSITION ASSURANCE ELEMENT FOR A POWER DISTRIBUTION BLOCK

BACKGROUND OF THE INVENTION

The field of the disclosure relates generally to power distribution blocks, and more particularly to devices that maintain a position of an electrical component within the power distribution block.

Power distribution blocks are known which may accommodate electrical components, i.e. fuses, circuit breakers, and relay switches, in a single unit, and thus provide both overcurrent protection and convenient switching of power. At least one such power distribution block, sometimes referred to as a vehicle electrical center (VEC) is commercially available from Cooper/Bussmann of St. Louis, Mo. Electrical components are typically held within their respective terminals via a friction fit arrangement and/or a biasing contact device. Known power distribution block are, however, disadvantaged in certain aspects.

SUMMARY OF THE INVENTION

In one exemplary aspect a power distribution block is provided that includes a housing, a plurality of terminals situated in the housing, a plurality of electrical components. Each electrical component is mechanically and electrically engaged to a respective terminal. A portion of each electrical component protrudes from the housing, and a component position assurance element substantially encloses the protruding portions of the electrical components.

In another exemplary aspect, a power distribution block is disclosed that includes a housing configured to accept a plurality of electrical components of different types and different sizes, at least one power input interface extending from the housing, at least one power output interface extending from the housing. A cover is attachable to the housing and encloses the electrical components, and a substantially rigid component position assurance element overlies the electrical components and is positioned between the housing and the cover.

In yet another exemplary embodiment, a power distribution block is disclosed that includes a housing defining a cavity, terminals situated in the cavity and being adapted to mechanically and electrically engage a plurality of electrical components, wherein the plurality of electrical components include at least one overcurrent protection component and at least one relay. The power distribution block also includes a cover attachable to the housing and enclosing the plurality of electrical components when engaged to the terminals, and a component position assurance element overlying the electrical components and positioned between the housing and the cover, wherein the component position assurance element prevents disengagement of the electrical components from the terminals.

In another exemplary aspect, a method of securing components in a power distribution block is disclosed, wherein the power distribution block includes a plurality terminals and a plurality of electrical components mechanically and electrically engaged to the terminals with plug-in connections. The method includes forming a component position assurance element to conform to a collective outer shape of at least two of the plurality of components, and configuring the component position assurance element to be biased against an outer portion of the at least two of the plurality of components, thereby preventing the electrical components from disengaging from the terminals.

In another exemplary aspect, a power distribution block is disclosed that includes a means for establishing mechanical and electrical connection to a plurality of electrical components, wherein the electrical components include at least one overcurrent protection device and at least one relay. The power distribution block also includes a means for providing a sealed enclosure about the means for establishing mechanical and electrical connection, and a means for providing position assurance between the means for establishing mechanical and electrical connection and the electrical components; wherein the means for providing position assurance simultaneously prevents multiple ones of the plurality of electrical components from disengaging with the means for establishing mechanical and electrical connection.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Power distribution block assemblies are disclosed in various embodiments that overcome disadvantages of existing terminal blocks in certain applications.

Known terminals of existing power distribution blocks sometimes fail to provide a sufficiently tight fit on the respective terminal element, and such elements may loosen within the terminal over time or may become decoupled from the terminal. For example, such loosening or decoupling may be caused by vibration imparted upon the power distribution block, when such power distribution blocks are used in vehicles or machinery, such as automobiles, construction and agricultural equipment, marine applications, and truck, bus, and RV applications. Additionally, the force of gravity may slowly pull electrical components from their respective terminals when the power distribution blocks are mounted in an upside down, or oblique orientation. To facilitate maintaining the electrical element within its respective terminal element, some known vibration-proof devices have been developed to keep the electrical component in place.

At least one known vibration-proof device exerts a biasing force upon the electrical component to facilitate maintaining the component within its respective terminal element. For example, a quantity of foam has been used to apply a biasing force against the electrical components and is held in place over the electrical components using the power distribution block cover. Such a foam insert may be difficult to install, and may make closing the cover of the power distribution block difficult, which may potentially damage internal components. Additionally, such inserts must be designed and fabricated to be resilient to external factors, such as heat and moisture. Such a design may make the insert expensive to produce and impractical to incorporate into the power distribution blocks. Moreover, such foam inserts may not adequately account for variations in height of the electrical components within the power distribution block and as such may fail to effectively maintain the electrical components within their respective terminals.

Figure 1:
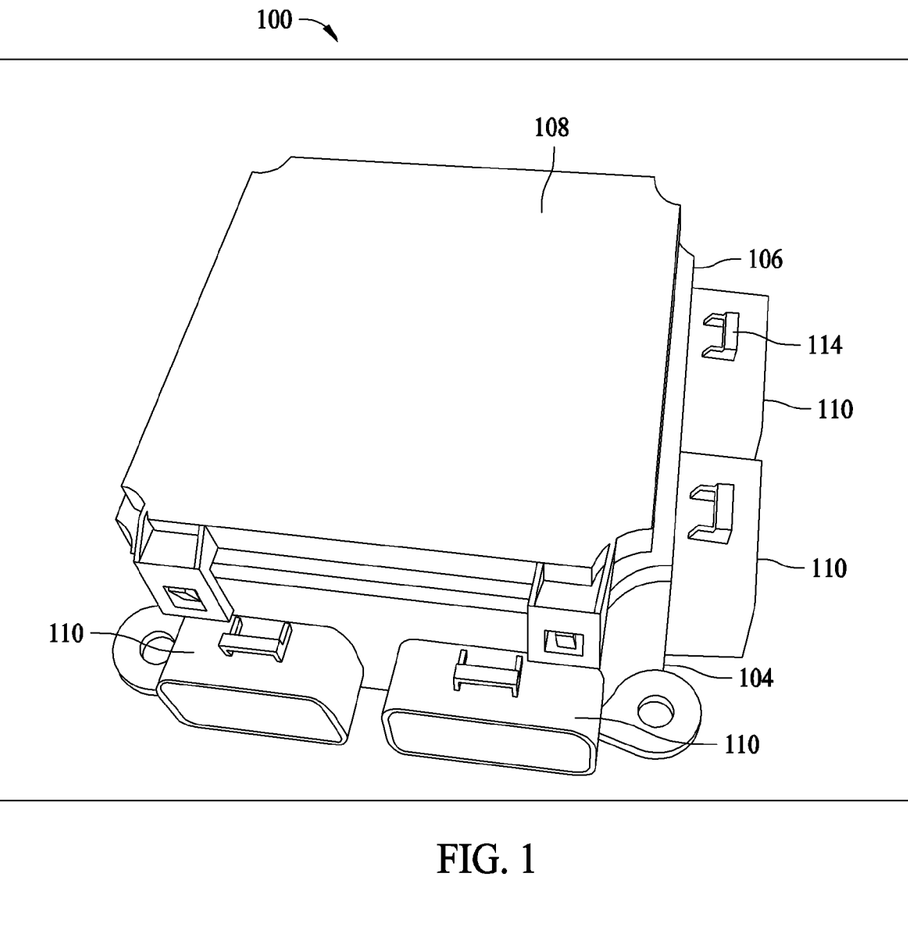
FIG. 1 is a perspective side elevation view of an exemplary power distribution block.
Figure 2:
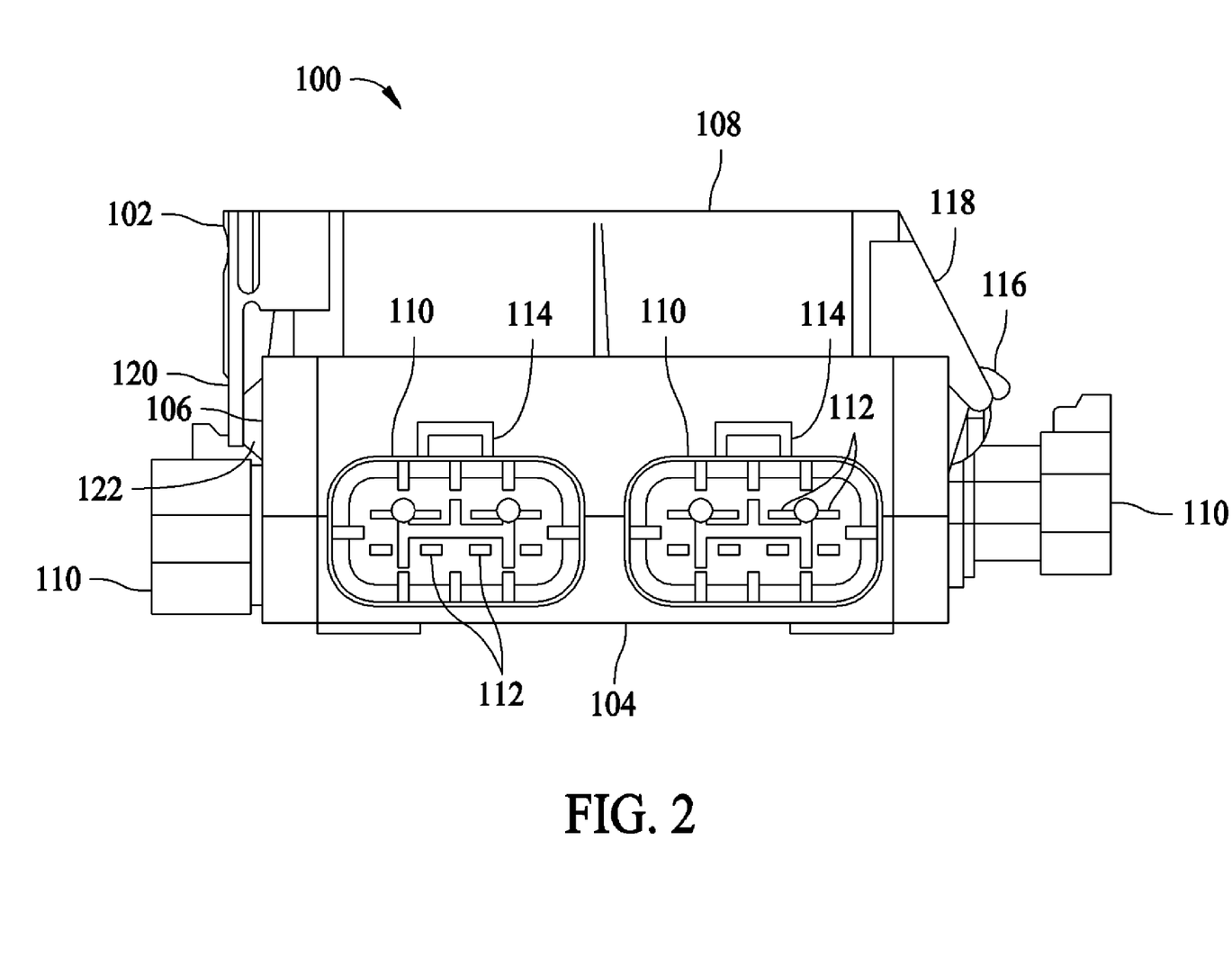
FIG. 2 is an end view of the power distribution block shown in FIG. 1.

Exemplary embodiments of power distribution blocks and methods of securing components are disclosed hereinbelow that overcome these and other disadvantages. FIG. 1 is a perspective view, and FIG. 2 is a side elevation view of an exemplary power distribution block 100 shown in a closed configuration. In the exemplary embodiment, power distribution block 100 includes a housing 102 having a bottom portion 104, a top portion 106 and a cover 108. Housing 102 includes a plurality of connector receptacles 110 that are mounted between top portion 106 and bottom portion 104 and sized and shaped to accommodate a connection to a plurality of electrical contacts 112 (shown in FIG. 2). Connector receptacles 110 also include a molded latch 114 that retains a raised tab of a mating connector (not shown). In the exemplary embodiment, cover 108 is hingedly coupled to top portion 106 via a hook assembly 116 (shown in FIG. 2) molded into top portion 106 and an eye assembly 118 molded into cover 108. A latching element 120 molded into cover 108 latches onto a catch feature 122 molded into top portion 106 to complete snap-fit attachment of cover 108 to top portion 106. Alternatively, cover 108 may be coupled to top portion 106 via a hinge (not shown in FIGS. 1 and 2), or any other connection configuration that enables power distribution block 100 to function as described herein. During operation, housing 102 provides a sealed enclosure for electrical components contained therein.

Figure 3:
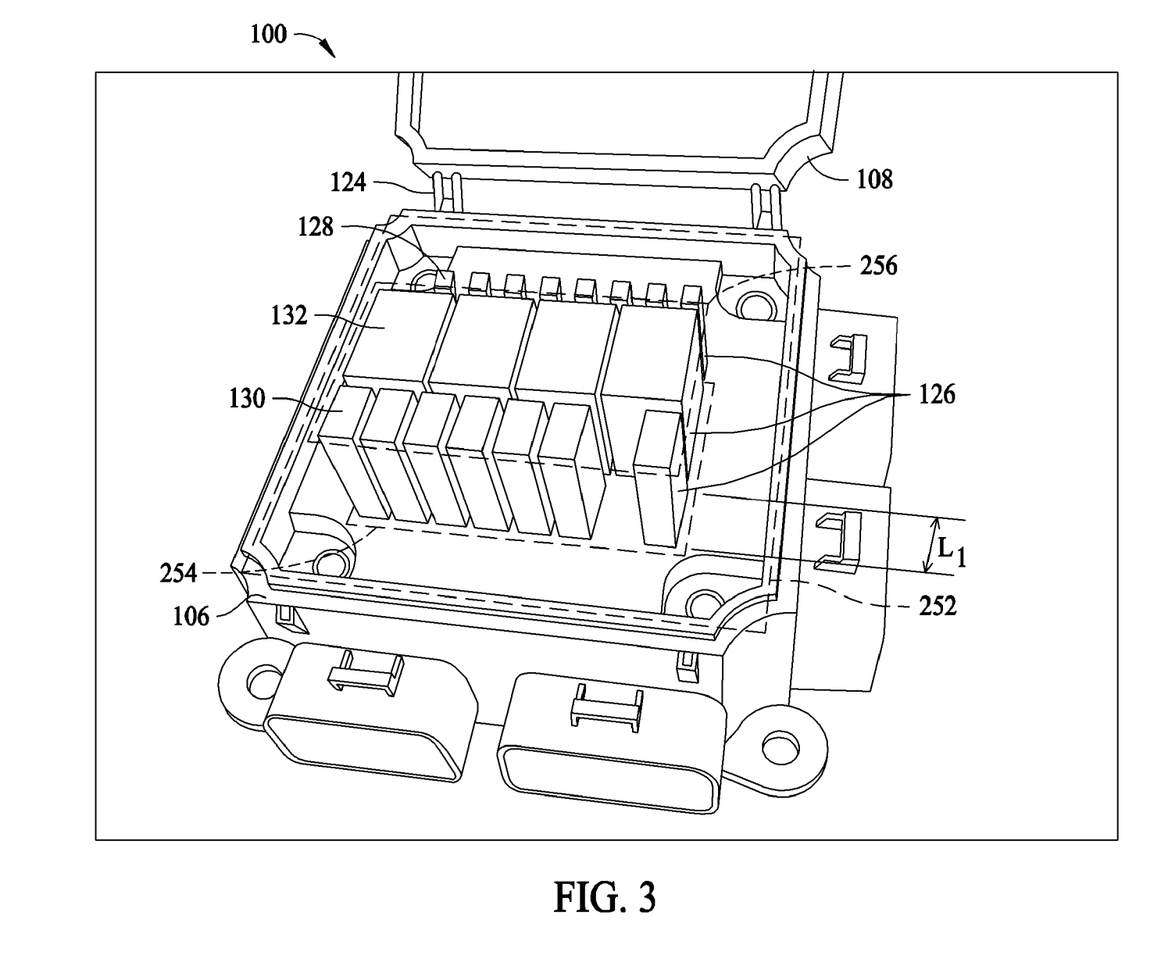
FIG. 3 is a perspective view of the power distribution block of FIG. 1 shown in an open configuration.

FIG. 3 is a perspective view of power distribution block 100 of FIG. 1 shown in an open configuration. Cover 108 has been rotated to an open position while still being coupled to top portion 106 via a hinge 124. In the exemplary embodiment, housing 102 includes a plurality of terminals 126 that are sized and shaped to receive a plurality of different types of electrical components 127, including for example, a fuse 128, a circuit breaker 130, and a relay 132. Alternatively, the electrical components may also include a diode (not shown) and/or a transorb (not shown). In the exemplary embodiment, terminals 126 establish a mechanical and electrical connection to the plurality of electrical components. Alternatively, any type of electrical connector device may be used to establish the mechanical and electrical connection to the plurality of electrical components. In the exemplary embodiment, terminals 126 are positioned and oriented within housing 102 such that at least a portion of at least one of the electrical components protrudes a distance $L_1$ from the top portion 106 of housing 102.

Figure 4:
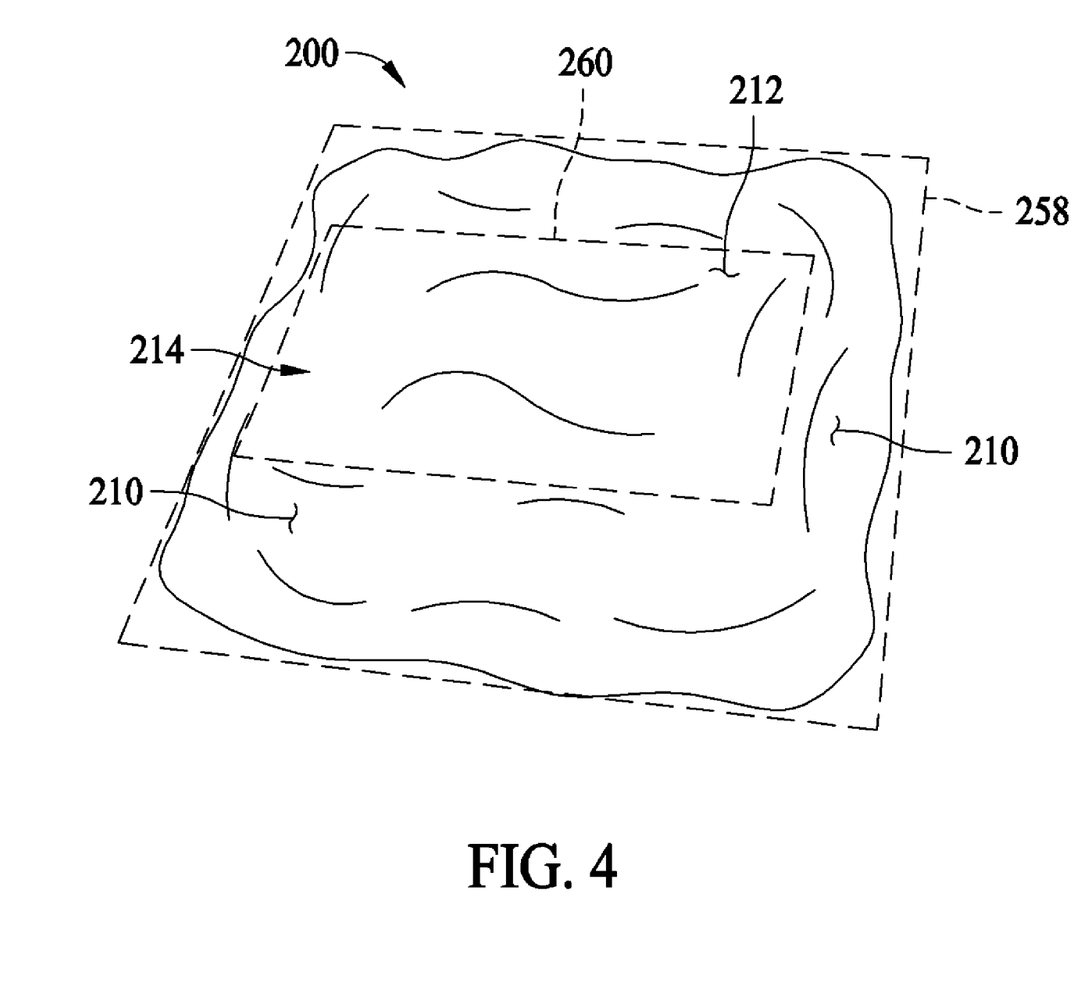
FIG. 4 is a schematic illustration of an exemplary component position assurance (CPA) element used with the power distribution block shown in FIGS. 1-3.
Figure 5:
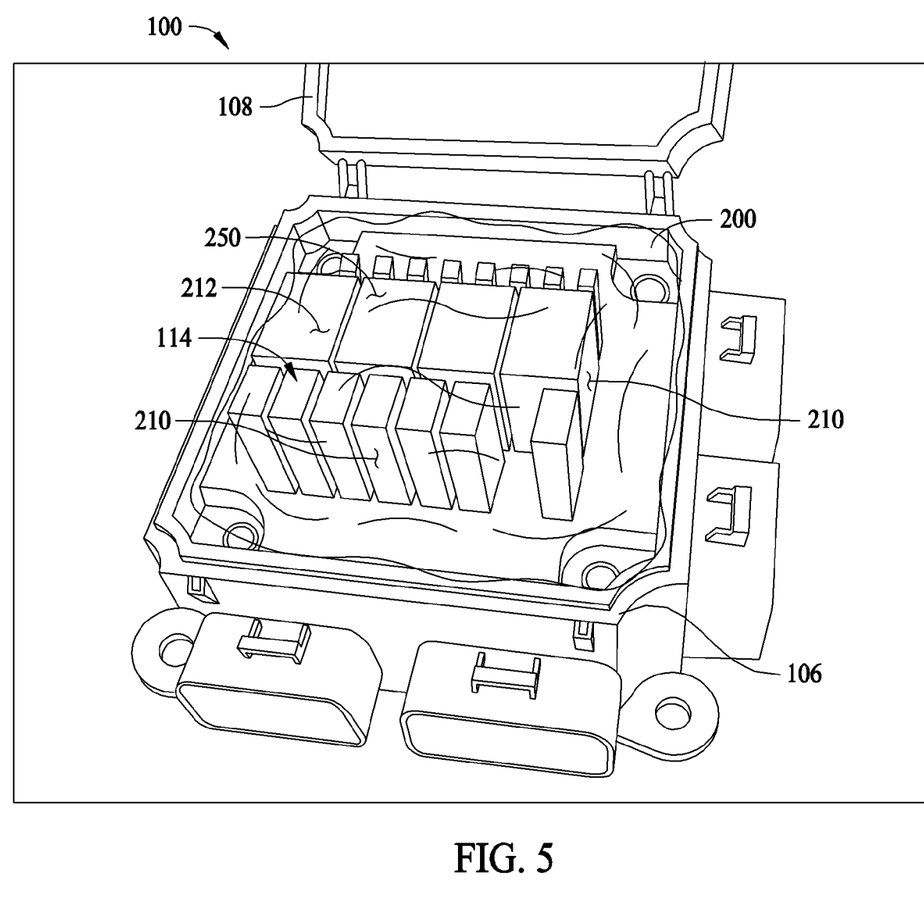
FIG. 5 is a perspective view of CPA element shown with the power distribution block in an open configuration.
Figure 6:
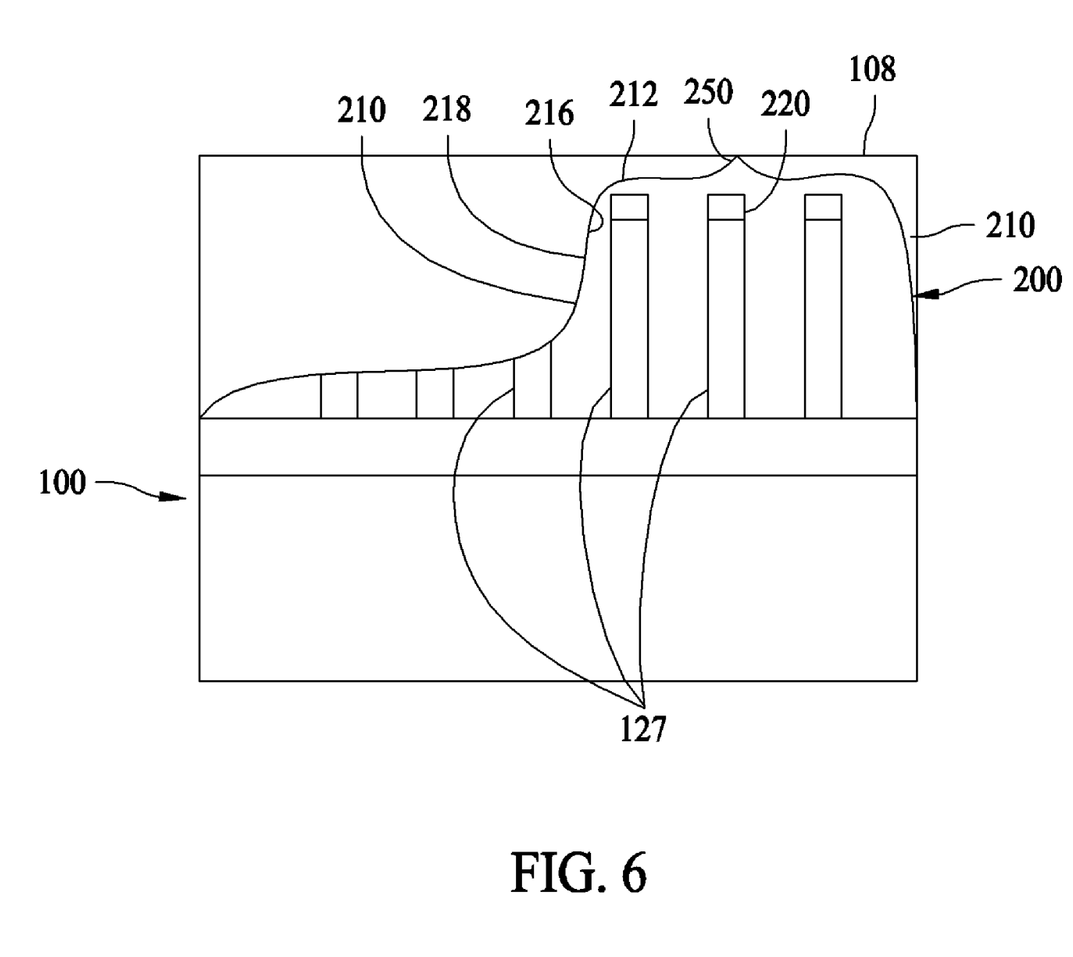
FIG. 6 is a side elevation view of CPA element shown with the power distribution block in a closed configuration.

FIG. 4 is a schematic illustration of an exemplary component position assurance (CPA) element 200 used with power distribution block 100. FIG. 5 is a perspective view of CPA element shown with power distribution block 100 in an open configuration, and FIG. 6 is a side elevation view of CPA element shown with power distribution block 100 in a closed configuration. In the exemplary embodiment, CPA element 200 includes a plurality of upstanding side walls 210 and a top wall 212 that extends therebetween such that a shell 214 is formed that includes an inner surface 216 and an outer surface 218. In the exemplary embodiment, CPA element 200 is fabricated from a substantially transparent, non-conductive thermoplastic material using a thermoforming process. Alternatively, CPA element 200 may be fabricated from any flexible material and by any fabrication process that enables CPA element 200 to function as described herein, specifically, to provide a biasing force against electrical components 127 when cover 108 is in the closed position, as shown in FIG. 1.

In the exemplary embodiment, CPA element 200 is fabricated such that at least a portion of shell 214 conforms to a collective shape of the protruding portions of the plurality of electrical components and facilitates accommodating varying heights, widths and depths of the protruding electrical components 127. More specifically, and in the exemplary embodiment, each electrical component 127 is located between the plurality of side walls 210 such that top wall 212 covers each protruding electrical component 127. CPA element 200 may be removably positioned within housing 102 when cover 108 is opened, as shown in FIG. 5. CPA element 200 is formed such that when CPA element 200 is positioned within housing 102, inner surface 216 rests against at least a portion of each protruding electrical component 127. More specifically and in the exemplary embodiment, inner surface 216 contacts at least a portion of a distal end 220 of electrical component 127.

CPA element 200 includes a protrusion 250 that extends outwardly from top wall 212 in a direction opposite that of the electrical components 127 when CPA element 200 is positioned within housing 102. In the exemplary embodiment, protrusion 250 is flexible and deformable, and is integrally formed within top wall 212. Alternatively, protrusion 250 may be separately formed and coupled to top wall 212 in any manner that enables CPA element 200 to function as described herein. When power distribution block 100 is in the closed configuration as shown in FIG. 6, cover 108 applies an inward force against protrusion 250 such that inner surface 216 of CPA element 200 is biased against protruding electrical components 127 described herein. This biasing force counteracts any outward force that may cause electrical components 127 to become decoupled from their respective terminals 126. Alternatively, CPA may not include a protrusion, and cover may instead apply the biasing force directly against outer surface of top wall to maintain electrical components 127 in their respective terminals and/or loose within their respective terminals 126.

Referring again to FIGS. 3 and 4, several dimensions are illustrated to provide clarity to the explanation given below. Each illustrated embodiment will be described in terms of a base area 252 defined as a horizontal cross sectional area of housing 102, and a terminal area 254 defined as the outer perimeter of all terminals 126 used in the illustrated configuration. Additionally, an electrical component area 256 is shown that is defined as an area of the uppermost surface defined by electrical components 127, a CPA floor area 258 is defined as the area of a bottom footprint of CPA element 200.

A CPA ceiling area 260 is an area of top wall 212. Explanation of subsequent figures may refer to items defined in FIGS. 3 and 4, but may not be directly referenced in the subsequent figures.

Figure 7:
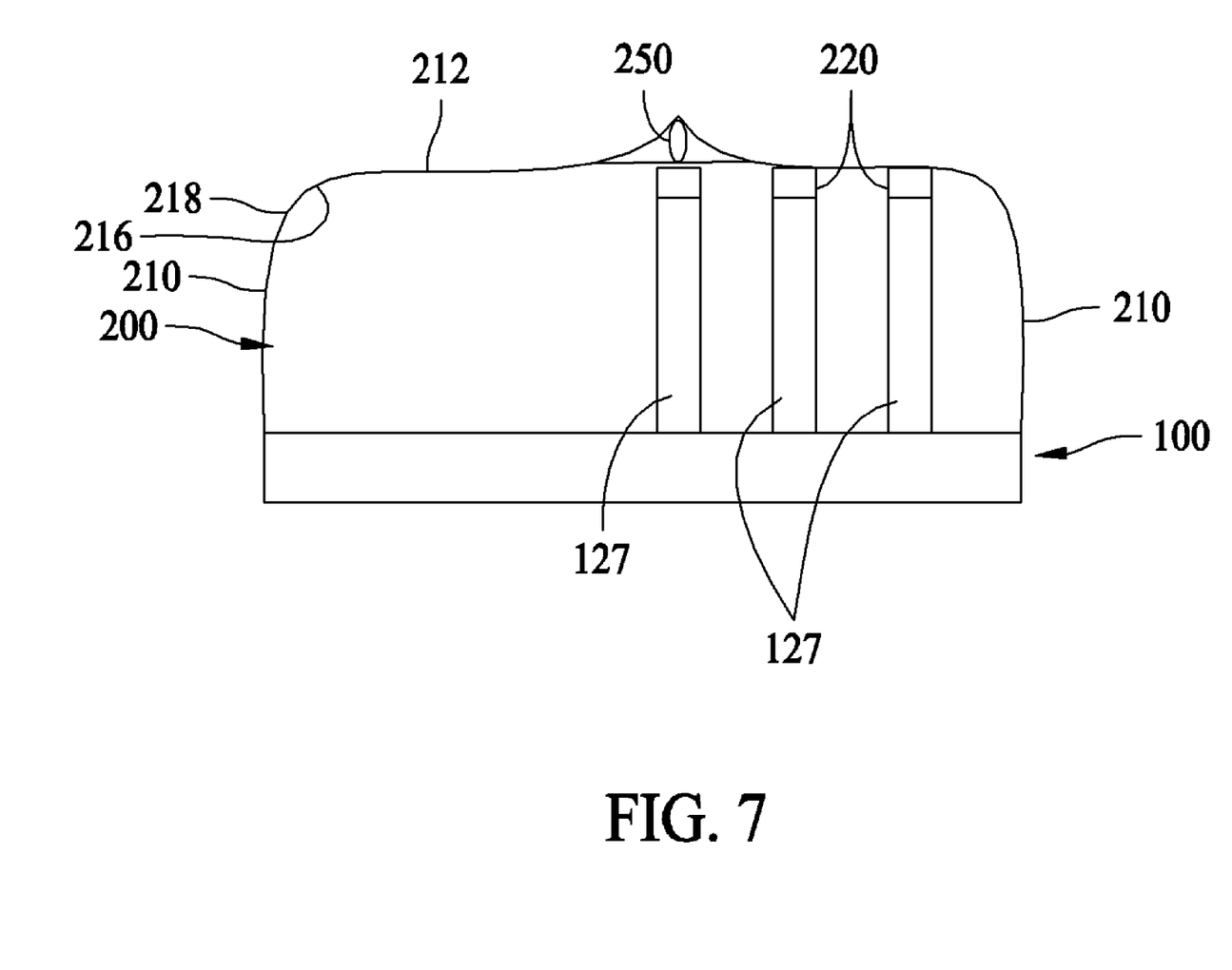
FIG. 7 is side elevation view of an exemplary alternative CPA element.

FIGS. 7-11 depict various alternative configurations of CPA element 200. FIG. 7 is side elevation view of an alternative CPA element 200. In the illustrated embodiment, CPA element 200 is fabricated such that CPA ceiling area 260 is substantially equivalent to CPA floor area 258, referring to areas illustrated in FIG. 4. As described herein, CPA inner surface 216 contacts electrical components 127, enabling a biasing force to be transmitted through protrusion 250 formed within top wall 212 to the electrical components 127 when cover 108 is placed in a closed configuration as shown in FIG. 1. The illustrated embodiment is useful, for example, for fabricating a CPA element 200 for a particular power distribution block 100 regardless of the number of electric components 127 placed therein.

Figure 8:
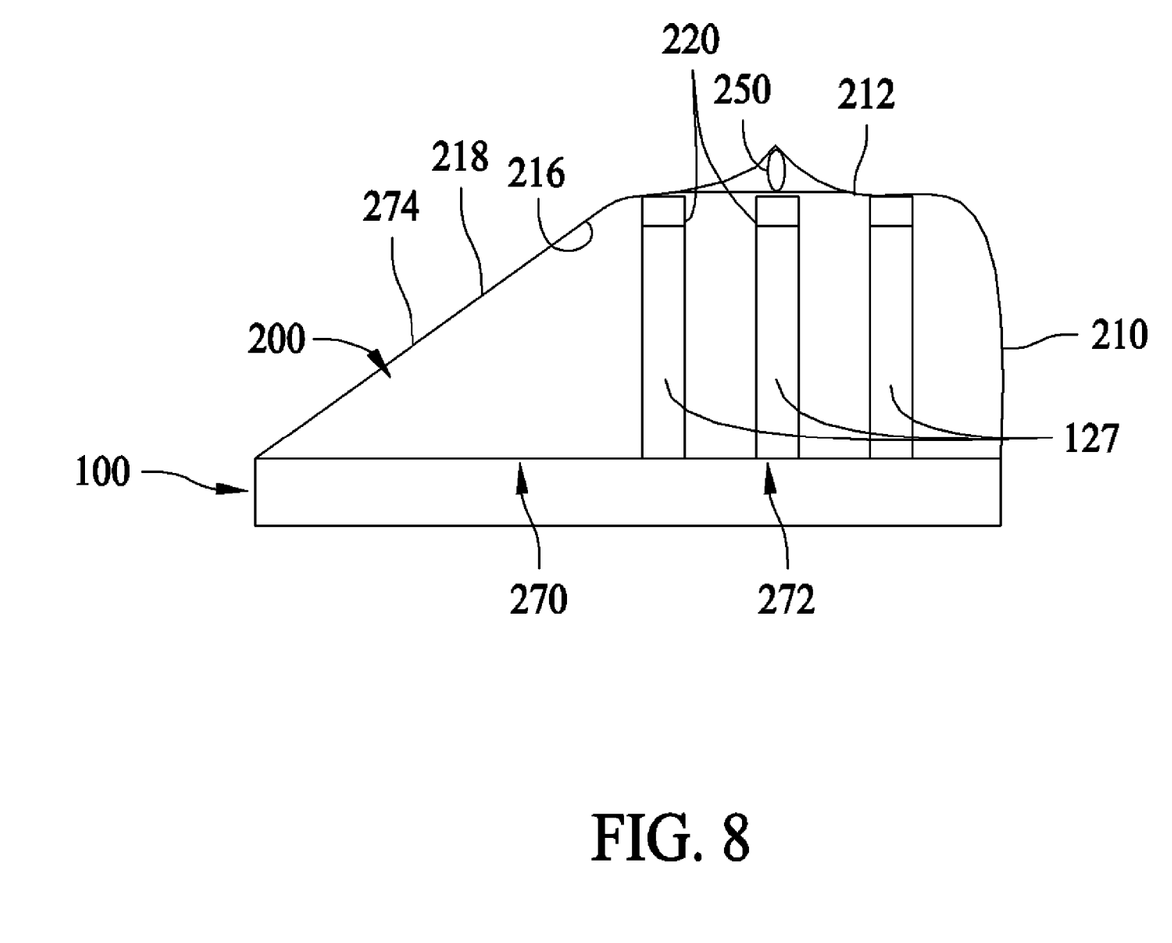
FIG. 8 is a side elevation view of another exemplary alternative CPA element.

FIG. 8 is a side elevation view of another alternative CPA element 200. In the illustrated embodiment, and referring to areas illustrated in FIGS. 3 and 4, CPA floor area 258 is larger than the electrical component area 256, and there is a substantially constant increase in elevation of the CPA element 200 from a section 270 of power distribution block 100 that contains no electrical components 127 to a section 272 of power distribution block 100 where the electrical components 127 are coupled within their respective terminals 126, thereby resulting in a portion of CPA element 200 having an angled surface 274. As described herein, CPA inner surface 216 contacts electrical components 127, enabling a biasing force to be transmitted through protrusion 250 formed within top wall 212 to the electrical components 127 when the cover is placed in a closed configuration as shown in FIG. 1.

Figure 9:
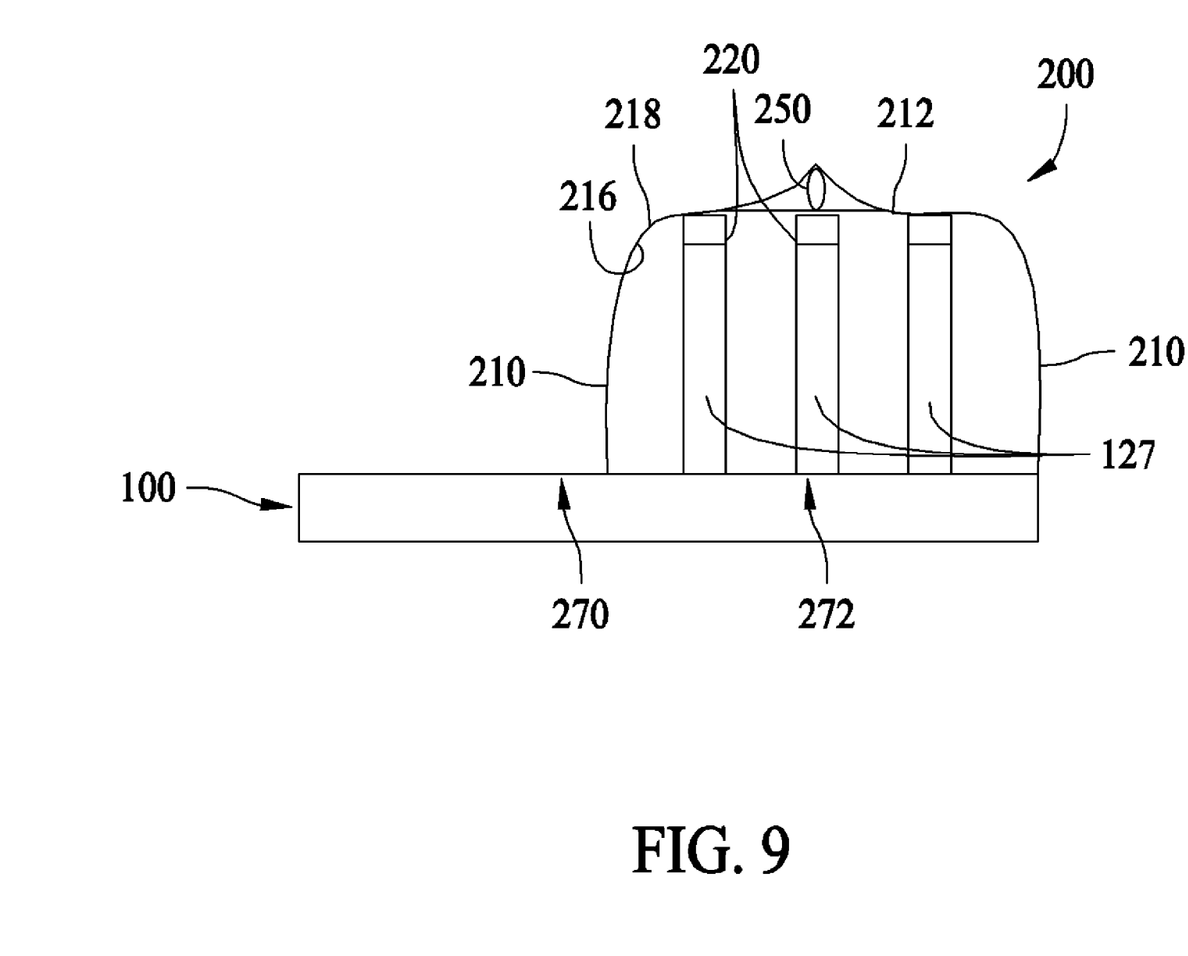
FIG. 9 is a side elevation view of yet another exemplary alternative CPA element.

FIG. 9 is a side elevation view of yet another alternative CPA element 200. In the illustrated embodiment, and referring to areas illustrated in FIGS. 3 and 4, CPA ceiling area 260 is substantially equal to CPA floor area 258, wherein CPA floor area 258 is less than base area 252 and extends over only the terminal area 254 on power distribution block 100. As described herein, CPA inner surface 216 contacts electrical components 127, enabling a biasing force to be transmitted through protrusion 250 formed within top wall 212 to the electrical components 127 when the cover is placed in a closed configuration as shown in FIG. 1.

Figure 10:
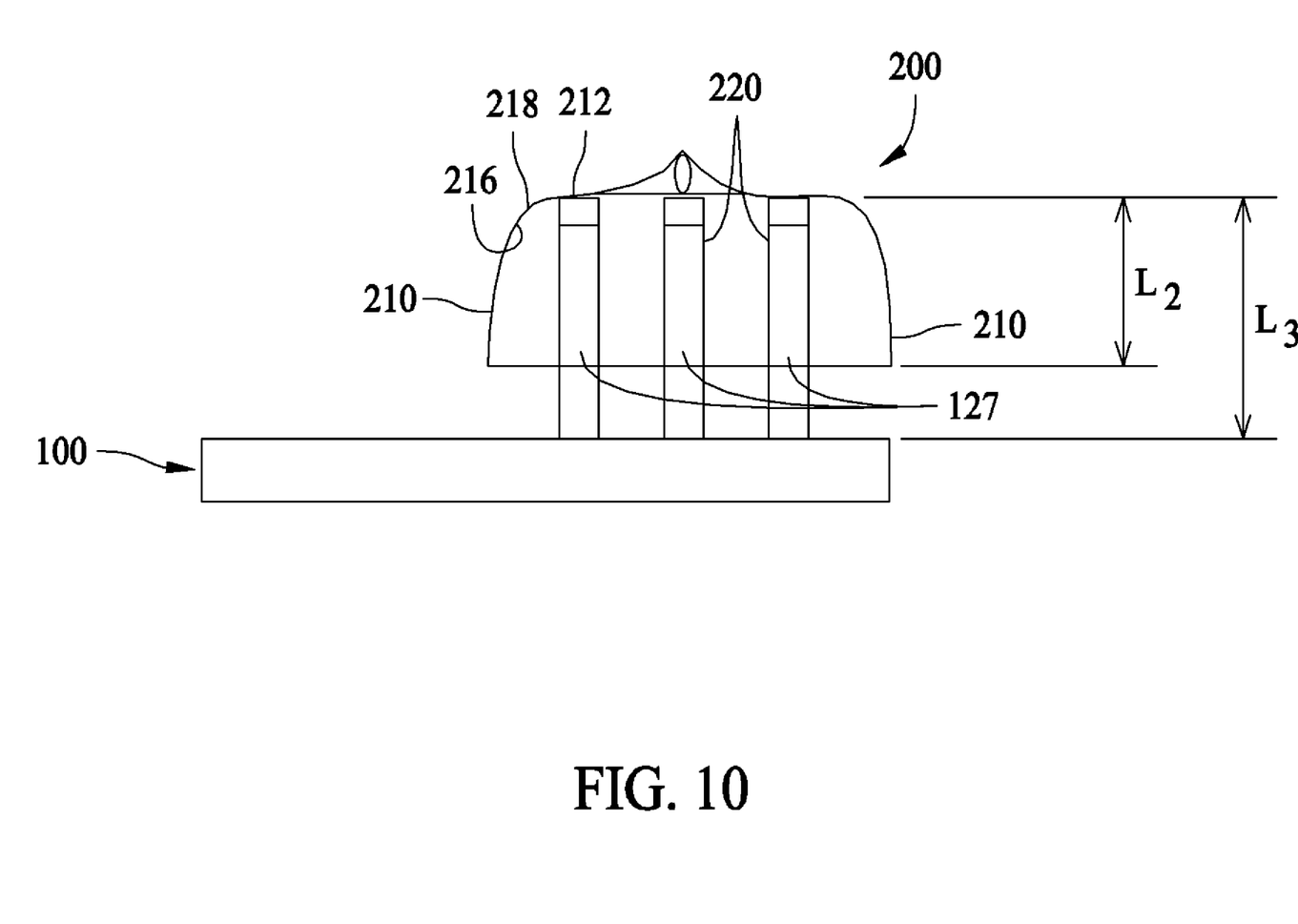
FIG. 10 is a side elevation view of an exemplary alternative CPA element used with the power distribution block shown in FIG. 1.

FIG. 10 is a side elevation view of an alternative CPA element 200 used with power distribution block 100 shown in FIG. 1. In the illustrated embodiment, side walls 210 of CPA element 200 extend a distance $L_2$ from top wall 212 wherein electrical components 127 extend from base area 252 of housing 102 a distance $L_3$, such that $L_2$ is less than $L_3$, referring to areas illustrated in FIG. 3. As described herein, CPA inner surface 216 contacts electrical components 127, enabling a biasing force to be transmitted through protrusion 250 formed within top wall 212 to the electrical components 127 when the cover is placed in a closed configuration as shown in FIG. 1.

Figure 11:
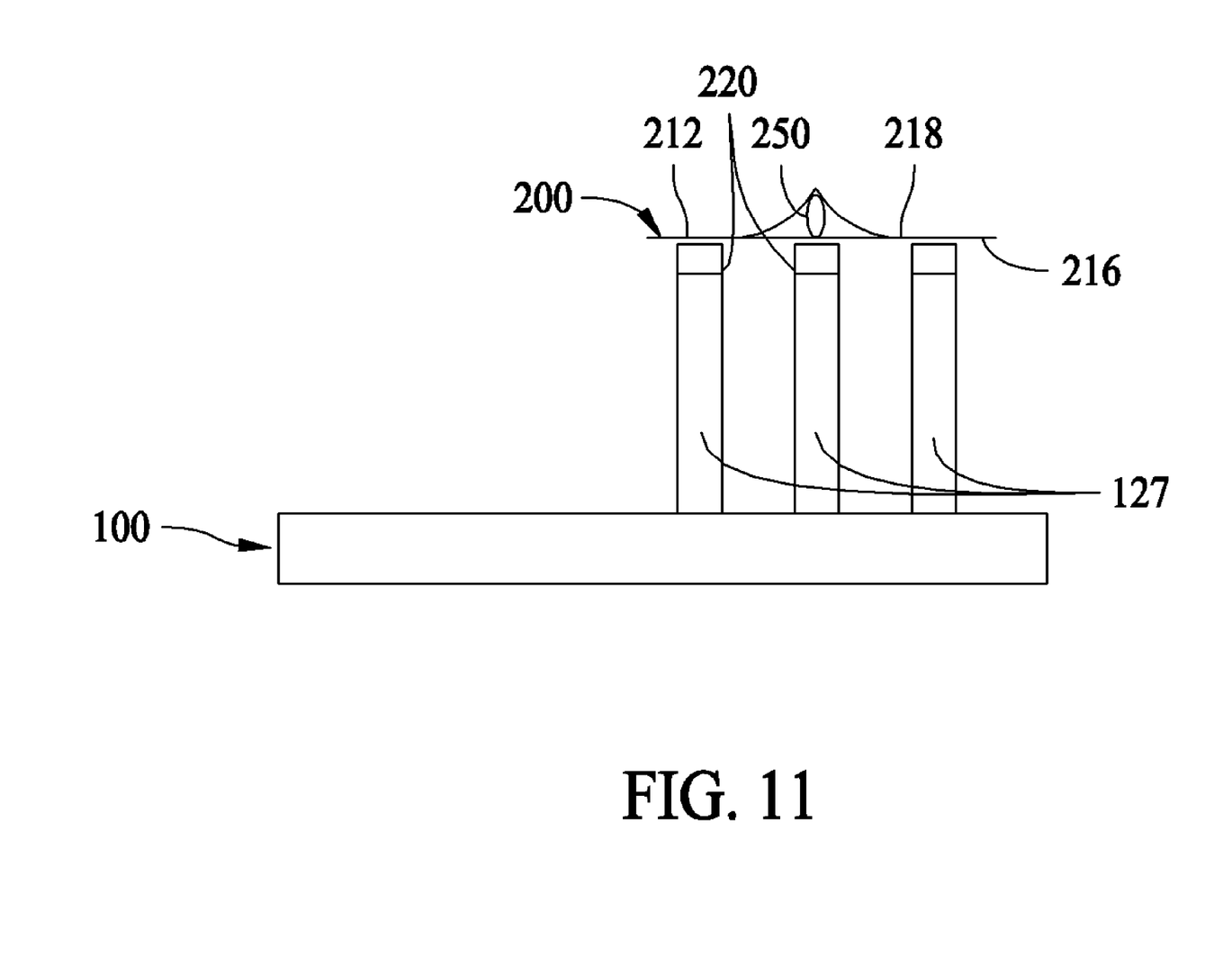
FIG. 11 is a side elevation view of an exemplary alternative CPA element used with the power distribution block shown in FIG. 1.

FIG. 11 is a side elevation view of an alternative CPA element 200 used with power distribution block 100 shown in FIG. 1. In the illustrated embodiment, CPA element 200 does not include side walls 210. Instead, CPA element 200 includes a top wall 212 that extends over electrical component area 256 shown in FIG. 3. As described herein, CPA inner surface 216 contacts electrical components 127, enabling a biasing force to be transmitted through protrusion 250 formed within top wall 212 to the electrical components 127 when the cover is placed in a closed configuration as shown in FIG. 1.

Figure 12:
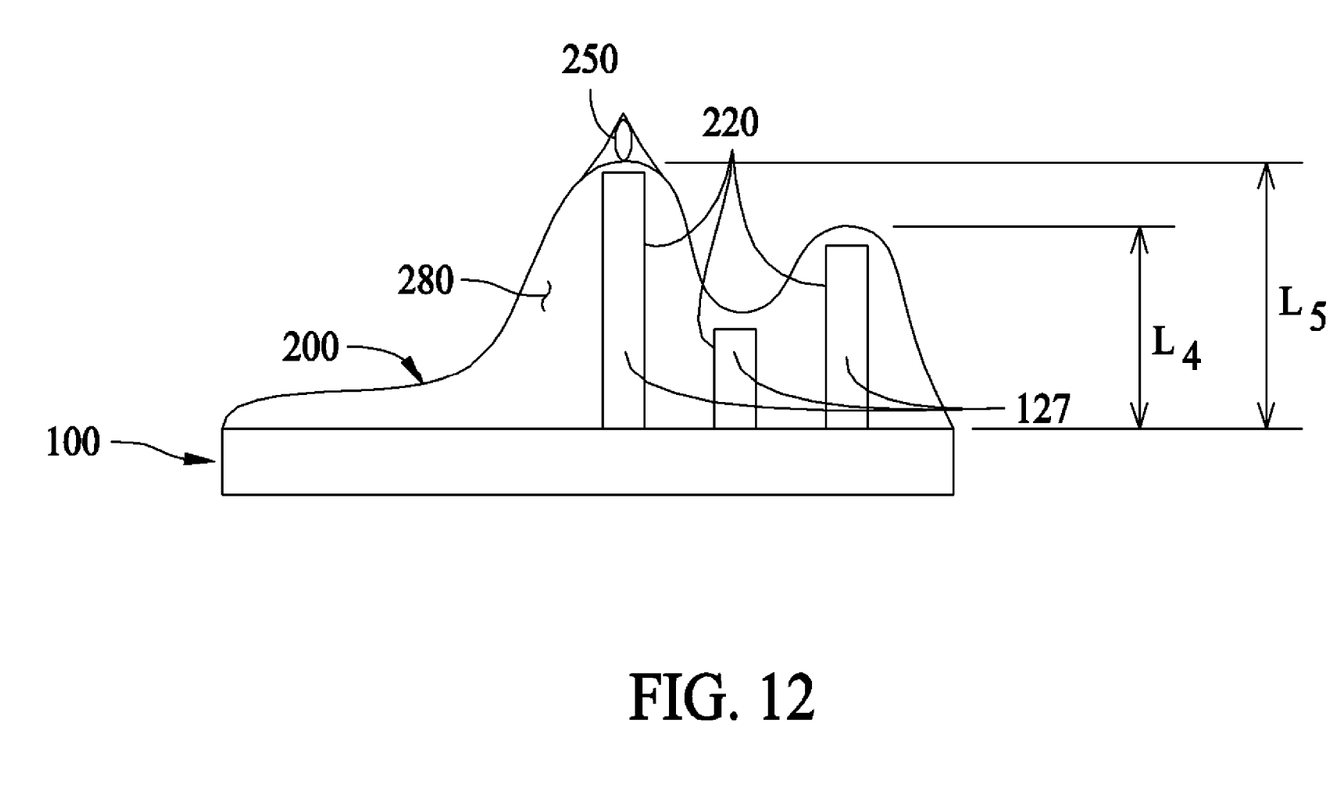
FIG. 12 is a side elevation view of an exemplary alternative CPA element used with the power distribution block shown in FIG. 1.

FIG. 12 is a side elevation view of an alternative CPA element 200 used with power distribution block 100 shown in FIG. 1. In the illustrated embodiment, top wall 212 of CPA element 200 includes an irregular surface 280, i.e. surface 280 varies in height relative to a height of each electrical component 127, wherein the electrical components 127 include at least two heights ($L_4$ and $L_5$). Such an irregular surface conforms to a collective shape of the electrical components 127 and facilitates accommodating varying heights, widths and depths of the protruding electrical components 127. It can be appreciated by one skilled in the art that each exemplary embodiment of CPA element 200 illustrated in FIGS. 4-12 and described herein in detail herein may include a top wall 212 having the irregular surface 280, depending upon the quantity, type and size of the electrical components 127 included therein. As described herein, CPA inner surface 216 contacts electrical components 127, enabling a biasing force to be transmitted through protrusion 250 formed within top wall 212 to the electrical components 127 when the cover is placed in a closed configuration as shown in FIG. 1.

In addition to cover 108 providing a biasing force upon CPA element 200 which in turn maintains a position of electrical components 127 within their respective terminals 126, alternatively, CPA element 200 may be fastened to housing 102 by any suitable coupling device, which may include, for example only, at least one of an adhesive, a screw, at least one snap-type fasteners, or hinges.

Figure 13:
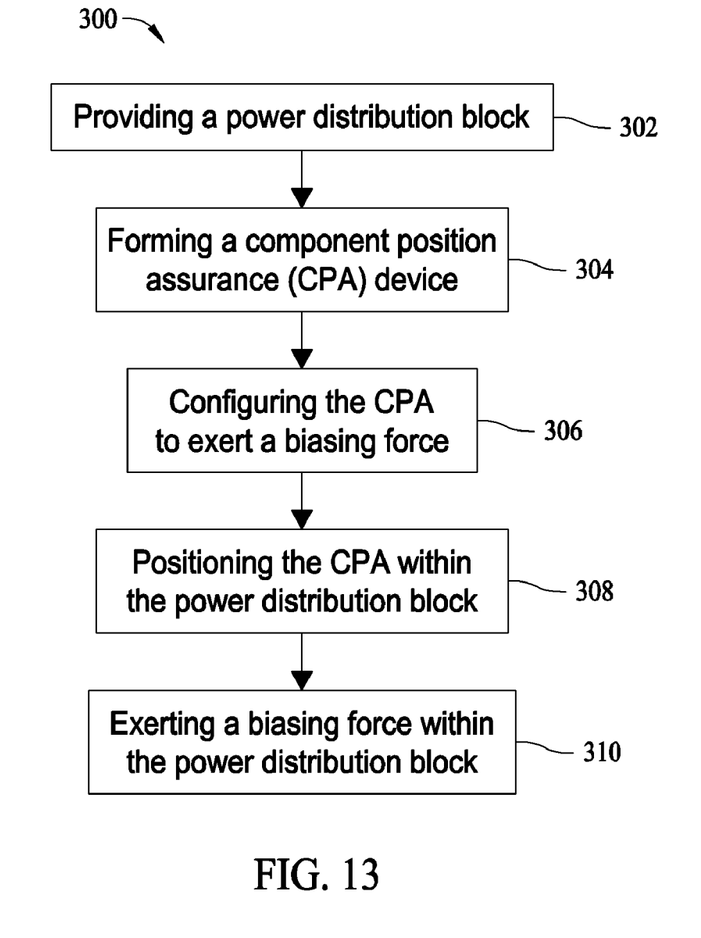
FIG. 13 is a flow diagram of an exemplary method of securing electrical components within the power distribution block shown in FIG. 1.

FIG. 13 is a flow diagram of an exemplary method 300 of securing electrical components within the power distribution block 100 shown in FIG. 1. In the exemplary embodiment, the method 300 includes providing 302 an exemplary power distribution block, such as for example power distribution block 100 shown in FIG. 1, that includes a plurality of terminals and a plurality of electrical components mechanically and electrically engaged to the terminals via respective plug-in connections, such as for example, the configuration shown in FIG. 3. Alternatively, method 300 may be applied to any power distribution block and to any electrical component configuration that is described herein, or any similar power distribution block. The method 300 includes forming 304 a component position assurance (CPA) element, such as CPA element 200 shown in FIG. 4, to conform to a collective outer shape of at least two of the electrical components, and configuring 306 the CPA element to be biased against an outer portion of the at least two of the electrical components included within the power distribution block. The method 300 then includes positioning 308 the CPA element within the power distribution block, and exerting 310 a biasing force against the electrical components, for example, by closing the cover of the power distribution block thereby preventing the electrical components from disengaging from the respective terminals, as described in more detail herein.

In the exemplary embodiment, forming 304 the component position assurance element to conform to a collective shape of at least two of the plurality of components further includes forming the CPA element to completely surround at least two electrical components within the power distribution block. Optionally, in an exemplary alternative embodiment, forming 304 the CPA element may further include forming the CPA element to conform to varying heights of the electrical components engaged within the respective terminals. In yet another exemplary alternative embodiment, forming 304 the CPA element may optionally include forming a plurality of sidewalls, wherein the side walls are sufficiently spaced from one another to surround all of the electrical components engaged within the respective terminals.

As described herein, an embodiment of a power distribution block is provided. In one embodiment, the power distribution block comprises a housing, a plurality of terminals situated in said housing, a plurality of electrical components, each of said plurality of electrical components mechanically and electrically engaged to respective ones of said plurality of terminals, wherein a portion of each electrical component protrudes from said housing, and a component position assurance element substantially enclosing the protruding portions of said plurality of electrical components.

Optionally, the component position assurance element described herein may be substantially transparent and comprise a thermoplastic material, and may conform to a collective shape of the protruding portions of the plurality of electrical components. Furthermore, the power distribution block described herein may comprise a cover attachable to the housing, wherein the cover biases the component position assurance element against the protruding portions of the plurality of electrical components, and wherein the cover may enclose the component position assurance element when the cover is moved to a closed position with respect to the housing. Moreover, the component position assurance element may be formed with a protrusion that mechanically engages the cover.

Also optionally, the component position assurance element described herein may comprise a plurality of upstanding side walls, and wherein all of the plurality of electrical components are located between said plurality of upstanding side walls. Alternatively, the component position assurance element may comprise at least one sidewall positioned adjacent one of said electrical components, and a top wall 212 having an irregular surface accommodating varying heights of the protruding portions of at least two of said electrical components.

The plurality of electrical components may optionally include overcurrent protection component such as a fuse, or a circuit breaker, and further may include a relay, a diode, and a transorb.

As further described herein, an alternative embodiment of power distribution block is disclosed. In that embodiment, the power distribution block comprises a housing configured to accept a plurality of electrical components of different types and different sizes, at least one power input interface extending from said housing, at least one power output interface extending from said housing, a cover attachable to said housing and enclosing said plurality of electrical components, and a substantially rigid component position assurance element overlying said plurality of electrical components and positioned between said housing and said cover.

In yet another embodiment a power distribution block is disclosed that comprises a housing defining a cavity, terminals situated in the cavity and being adapted to mechanically and electrically engage a plurality of electrical components, the plurality of electrical components including at least one overcurrent protection component and at least one relay, a cover attachable to said housing and enclosing said plurality of electrical components when engaged to the terminals, and a component position assurance element overlying said plurality of electrical components and positioned between said housing and said cover, wherein the component position assurance element prevents disengagement of the plurality of electrical components from the terminals.

A method of securing components in a power distribution block is disclosed, wherein the power distribution block includes a plurality terminals and a plurality of electrical components mechanically and electrically engaged to the terminals with plug-in connections. The method comprises forming a component position assurance element to conform to a collective outer shape of at least two of the plurality of components, and configuring the component position assurance element to be biased against an outer portion of the at least two of the plurality of components, thereby preventing the electrical components from disengaging from the terminals.

Optionally, the method of securing components in a power distribution block may comprise forming the component position assurance element to completely surround the at least two components. Alternatively, the method may comprise forming the component position assurance element to conform to varying heights of the electrical components engaged to the terminals, or may comprise forming a plurality of sidewalls, the side walls sufficiently spaced from one another to surround all of the electrical components engaged to the terminals.

Another power distribution block is disclosed that comprises a means for establishing mechanical and electrical connection to a plurality of electrical components, the electrical components including at least one overcurrent protection device and at least one relay, a means for providing a sealed enclosure about the means for establishing mechanical and electrical connection, and a means for providing position assurance between the means for establishing mechanical and electrical connection and the electrical components; wherein the means for providing position assurance simultaneously prevents multiple ones of the plurality of electrical components from disengaging with the means for establishing mechanical and electrical connection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution block comprising:
   a housing having a bottom portion and a top portion;
   a plurality of terminals situated in said housing;
   a plurality of electrical components, mechanically and electrically engaged to respective ones of said plurality of terminals, at least some of the plurality of electrical components including a protruding portion extending from the top portion said housing;
   a cover providing a first enclosure for the top portion and the plurality of electrical components; and
   a component position assurance element separately provided from the cover, the component position assurance element defining a second enclosure substantially enclosing the protruding portions of said plurality of electrical components.

2. The power distribution block of claim 1, wherein the component position assurance element comprises a thermoplastic material.

3. The power distribution of claim 1, wherein the component position assurance element is substantially transparent.

4. The power distribution block of claim 1, wherein the component position assurance element conforms to a collective shape of the protruding portions of the plurality of electrical components.

5. The power distribution block of claim 1, wherein the cover engages the component position assurance element and forces the component position assurance element against the protruding portions of at least some of the plurality of electrical components.

6. The power distribution block of claim 1, wherein the cover is movable relative to the housing between opened and closed positions, and the first enclosure is completed when the cover is moved to a closed position with respect to the housing.

7. The power distribution block of claim 1, the component position assurance element formed with a protrusion that mechanically engages the cover.

8. The power distribution block of claim 1, wherein the component position assurance element comprises a plurality of upstanding side walls, and wherein all of the plurality of electrical components are located between said plurality of upstanding side walls.

9. The power distribution block of claim 1, wherein the component position assurance element comprises at least one sidewall positioned adjacent one of said electrical components, and a top wall having an irregular surface accommodating varying heights of the protruding portions of at least two of said electrical components.

10. The power distribution block of claim 1, wherein the plurality of electrical components include at least one of a fuse, a circuit breaker, a relay, a diode, and a transorb.

11. The power distribution block of claim 1, wherein the plurality of electrical components include at least one overcurrent protection component and at least one relay.

12. A power distribution block comprising:
a housing configured to accept a plurality of electrical components of different types and different sizes;
at least one power input interface extending from said housing;
at least one power output interface extending from said housing;
a cover attachable to said housing and enclosing said plurality of electrical components; and
a substantially rigid component position assurance element separately provided from said cover and overlying said plurality of electrical components and positioned between said housing and said cover, wherein the component position assurance element conforms to a collective shape of the plurality of electrical components beneath the cover.

13. The power distribution block of claim 12, wherein the component position assurance element comprises a thermoplastic material.

14. The power distribution of claim 12, wherein the component position assurance element is substantially transparent.

15. The power distribution block of claim 12, wherein the cover biases the component position assurance element against the protruding portions of the plurality of electrical components.

16. The power distribution block of claim 12, wherein the cover encloses the component position assurance element when the cover is in a closed position with respect to the housing.

17. The power distribution block of claim 12, wherein the component position assurance element formed with a protrusion that mechanically engages the cover.

18. The power distribution block of claim 12, wherein the component position assurance element comprises a plurality of upstanding side walls, and wherein all of the plurality of electrical components are located between said plurality of upstanding side walls.

19. The power distribution block of claim 12, wherein the component position assurance element comprises at least one sidewall positioned adjacent one of said electrical components, and a top wall having an irregular surface accommodating varying heights of the protruding portions of at least two of said electrical components.

20. The power distribution block of claim 12, wherein the plurality of electrical components include at least one of a fuse, a circuit breaker, a relay, a diode, and a transorb.

21. The power distribution block of claim 12, wherein the plurality of electrical components include at least one overcurrent protection component and at least one relay.

22. A power distribution block comprising:
a housing defining a cavity;
terminals situated in the cavity and being adapted to mechanically and electrically engage a plurality of electrical components, the plurality of electrical components including at least one overcurrent protection component and at least one relay;
a cover attachable to said housing and enclosing said plurality of electrical components when engaged to the terminals; and
a component position assurance element overlying said plurality of electrical components and positioned between said housing and said cover, wherein the component position assurance element conforms to a collective shape of the plurality of electrical components beneath the cover;
wherein the component position assurance element is separately supplied from the cover and prevents disengagement of the plurality of electrical components from the terminals.

23. The power distribution block of claim 22, wherein the component position assurance element comprises a thermoplastic material.

24. The power distribution of claim 22, wherein the component position assurance element is substantially transparent.

25. The power distribution block of claim 22, wherein the cover biases the component position assurance element against the protruding portions of the plurality of electrical components.

26. The power distribution block of claim 22, wherein the component position assurance element formed with a protrusion that mechanically engages the cover.

* * * * *